United States Patent [19]

Yoshimura et al.

[11] Patent Number: 5,063,453

[45] Date of Patent: Nov. 5, 1991

[54] DIGITAL SIGNAL RECORDING APPARATUS

[75] Inventors: Katsuji Yoshimura, Kanagawa; Akio Aoki, Tokyo; Makoto Shimokoriyama, Kanagawa; Motokazu Kashida, Tokyo; Shinichi Yamashita; Kenichi Nagasawa, both of Kanagawa, all of Japan

[73] Assignee: Canon Kabushiki Kaisha, Tokyo, Japan

[21] Appl. No.: 647,683

[22] Filed: Jan. 28, 1991

Related U.S. Application Data

[63] Continuation of Ser. No. 200,625, May 31, 1988, abandoned.

[30] Foreign Application Priority Data

Jun. 8, 1987 [JP] Japan .............................. 62-143875
Jun. 9, 1987 [JP] Japan .............................. 62-144748
Jul. 31, 1987 [JP] Japan .............................. 62-192267

[51] Int. Cl.$^5$ .............................................. G11B 5/09
[52] U.S. Cl. ............................................ 360/32; 360/8
[58] Field of Search ...................................... 360/8, 32

[56] References Cited

U.S. PATENT DOCUMENTS 4,730,222  3/1988  Schauffele ........................... 360/8

Primary Examiner—Vincent P. Canney
Attorney, Agent, or Firm—Robin, Blecker, Daley & Driscoll

[57] ABSTRACT

A digital signal recording apparatus is provided with data compressing means for reducing the amount of data of digital information supplied; recording means which is arranged to be capable of selectively recording the digital data supplied or digital data compressed by the data compressing means by means of at least one pair of heads; and switching means for switching a cycle in which recording is performed by the pair of heads from one cycle over to another according to the information to be recorded by the recording means.

20 Claims, 13 Drawing Sheets

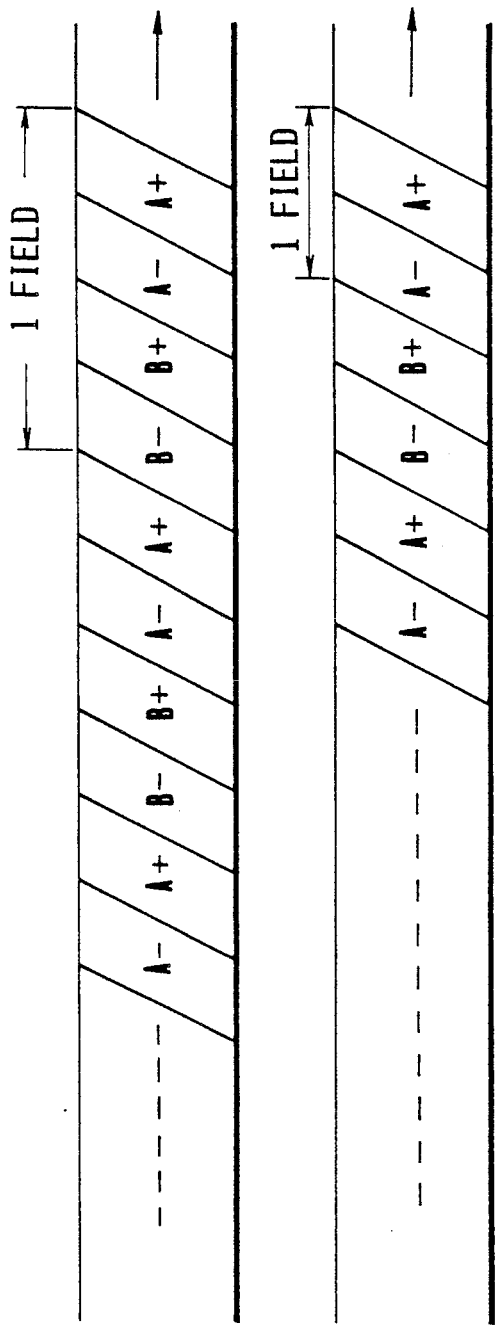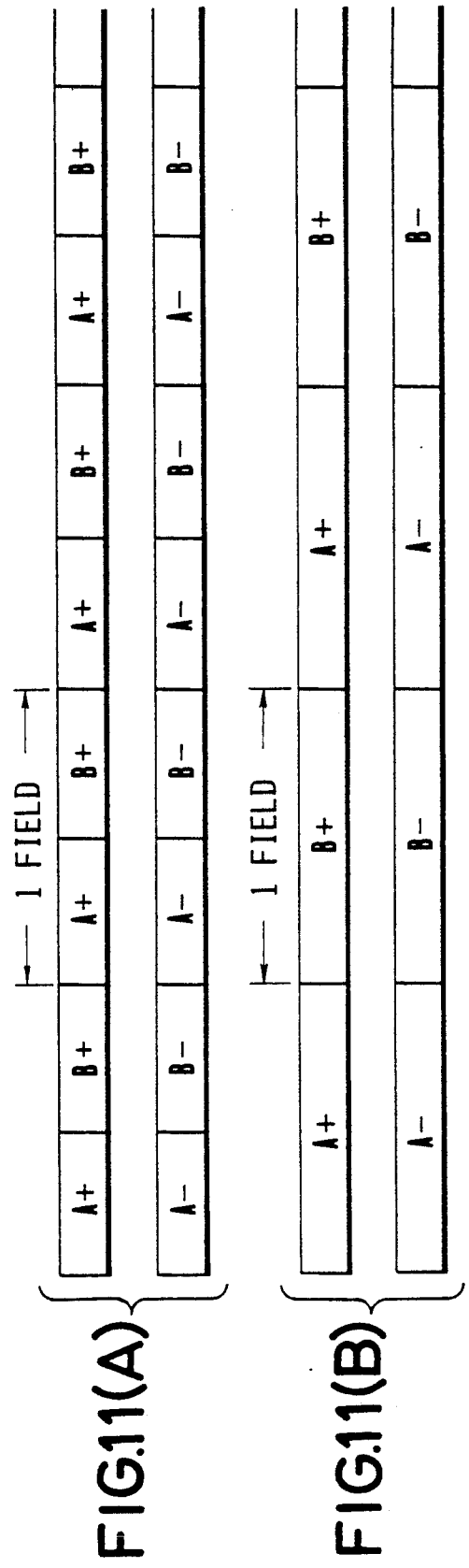

DIGITAL SIGNAL RECORDING APPARATUS

This is a continuation application continuation application under 37 CFR 1.62 of prior application Ser. No. 200,625, filed May 31, 1988, now abandoned.

BACKGROUND OF THE INVENTION

1. Field of the Invention

This invention relates to a digital signal recording apparatus and more particularly to a digital signal recording apparatus which is capable of changing the amount of information to be recorded per unit time from one value over to another.

2. Description of the Related Art

To make alterable the length of recording time on one and the same recording medium, conventional apparatuses for recording an analog signal of a wide frequency band, such as a video signal, have generally adopted a method of changing a recording track pitch, as in the case of a video tape recorder (hereinafter referred to as VTR). This method increases the recordable length of time at the expense of the dynamic range of the S/N ratio of a recording signal. The VTR of this kind is thus arranged to permit track pitch setting as desired without much difficulty and can be set at a desired length of recording time with comparative ease. Therefore, there has been no technical difficulty in arranging the VTR to permit recording time setting at various values.

Meanwhile, the advancement of digital signal processing technology of recent years has resulted in the development of a digital video tape recorder (hereinafter referred to as D-VTR) which is arranged to digitize the analog signal of a wide frequency band, such as a video signal, and to record or reproduce the signal by performing digital modulation before recording. The S/N ratio of the signal reproduced by the D-VTR is independent of the quality of the reproduced information. However, when the S/N ratio is below a certain value, reproduction itself becomes impossible. In the case of the D-VTR of this kind, therefore, the arrangement to make the recording time variable by changing the track pitch is meaningless as the image is recorded or reproduced at the same quality at any track pitch selected. In the case of the D-VTR, therefore, signal recording or reproduction is preferably performed at a track pitch which is predetermined to allow adequate reproduction of digital data. In this case, it is hardly conceivable to make any arrangement for varying the recording time by changing this track pitch.

In view of this, for the D-VTR of this kind, long-time recording has been made possible by reducing the amount of data to be recorded. In other words, the recording time is arranged to be variable by changing the number of tracks to be formed per unit time.

A method for changing the recording time in this manner has been disclosed in Japanese Laid-Open Patent Application No. SHO 61-77104. This method is as follows: FIG. 1 of the accompanying drawings shows the head arrangement of the conventional VTR of the above stated kind. A magnetic tape T is caused by tape guide posts $101a$ and $101b$ to be wrapped at least 180 degrees around a rotary cylinder 102. Four rotary heads Ha−, Ha+, Hb− and Hb+ are mounted on the cylinder 102 and are spaced at a phase difference of 90 degrees from each other. These heads are disposed at the same height in the direction of the axis of rotation. The heads Ha+ and Hb+ have a first azimuth angle (hereinafter referred to as a plus azimuth) and the heads Ha− and Hb− a second azimuth angle (hereinafter referred to as minus azimuth).

In a standard recording mode, a recording signal is supplied to all the heads tracing the surface of the tape T. The heads record the signal while forming tracks one after another in rotation in the order of head Ha+, head Ha−, head Hb+ and head Hb−. FIG. 2(A) shows a recording pattern obtained in the standard recording mode of the VTR having the head arrangement as shown in FIG. 1. The heads Ha+, Ha−, Hb+ and Hb− respectively form tracks Ta+, Ta−, Tb+ and Tb−.

In a long-time recording mode, the tape T is transported at a speed which is ⅓ of the speed of the standard recording mode. Meanwhile, the rotary cylinder 102 is rotated in the same direction and at the same speed as in the standard recording mode. In this case, the amount of recording data is compressed to ⅓. The head Hb− performs recording after completion of recording by the head Ha+. More specifically, the heads traces the surface of the magnetic tape T in rotation in the order of head Ha+, head Ha−, head Hb+ and head Hb− every time the cylinder 102 turns around 90 degrees in the same manner as in the case of the standard recording mode. However, the heads Ha− and Hb+ do not perform signal recording after completion of recording by the head Ha+. Accordingly, the recordable amount of data per unit time is reduced to ⅓ thereof. However, the above stated data compression makes it possible to record the same time length portion of the video signal.

FIG. 2(B) shows a recording pattern obtained in the long-time recording mode of the VTR shown in FIG. 1. The same reference symbols as those used in FIG. 2(A) denote the same tracks. The long-time mode somewhat differs form the standard mode in the inclination of the tracks. However, the track pitches obtained in these two modes are almost equal to each other if the difference between the track angles $\phi a$ and $\phi b$ shown in these drawings is sufficiently small. In short, the same time length portion of the video signal is recordable in two tracks in the long-time recording mode as in six tracks formed in the standard recording mode.

There are varied methods for changing the recordable amount of data. In one method, for example, the number of bits for each picture element of the video signal is changed. In another method among others, sampling frequency is changed.

However, in performing the so-called azimuth recording with the D-VTR, the head of the plus azimuth and the head of the minus azimuth are used alternately with each other. Therefore, in relation to the mode in which all the tape tracing heads perform recording (the standard recording mode int he case of the prior art VTR described), data compressible rates are limited to values which are one odd fraction of the amount of data.

Meanwhile, the currently known data compressing methods include many methods in which data is arranged to be compressed to ½ by sampling or frame reduction or the like. In view of these methods, the VTR of the above stated kind arranged to permit setting it at one of a plurality of recording time values is preferably arranged to permit selection of any desired value for the long-time recording mode from among the data compressing rates relative to the standard recording mode.

Further, if the D-VTR of the kind described is to be arranged to have the recordable amount of data per unit time changeable to any of varied values, varied data compression rates are necessary. Then, to have an n-number of different selectable recording time values, for example, the VTR must have (n−1) channels of a digital signal processing system. This requirement inevitably results in a complex arrangement of the VTR.

SUMMARY OF THE INVENTION

It is, therefore, an object of this invention to provide a digital recording apparatus which is arranged to permit the data compression rate to be settable at any desired rate.

Under this object, a digital information signal recording apparatus arranged according to this invention as a first embodiment thereof comprises: head means including at least one pair of heads which are arranged to have different azimuth angles and to rotate close to each other; data compressing means for reducing the amount of digital data; selection means for selectively producing one of digital data to be supplied to the data compressing means and digital data compressed by the data compressing means; signal processing means, arranged to receive the data produced from the selection means, for supplying a recording signal to the head means such that the data is periodically recorded by the pair of heads in a given amount at a time; and mode switching means for switching an operation mode of the apparatus between a plurality of modes, including a first mode in which the selection means produces the data to be supplied to the data compressing means and the signal processing means supplies the head means with the recording signal including the given amount of data for every given period of time t, and a second mode in which the selection means produces the data compressed by the data compressing means and the signal processing means supplies the head means with the given amount of data for every given period of time nt, wherein "n" represents an integer which is at least 2.

A digital information signal recording apparatus which is arranged according to the invention as a second embodiment thereof comprises: head means including at least one rotary head; data compressing means for reducing the amount of digital data; selection means for selectively producing one of digital data to be supplied to the data compressing means and digital data compressed by the data compressing means; signal processing means, arranged to receive the data produced from the selection means, for supplying a recording signal to the head means to have the data recorded on a recording medium; transportation means for transporting the recording medium in the direction of intersecting a tracing direction in which the rotary head traces the recording medium; and mode switching means for switching an operation mode of the apparatus between a plurality of modes including a first mode in which the selection means produces the data to be supplied to the data compressing means, the rotary head rotates at a given speed w and the transportation means transports the recording medium at a given speed v, and a second mode in which the selection means produces the data compressed by the data compressing means. The rotary head rotates at a given speed w/n and the transportation means transports the recording medium at a given speed v/n, wherein "n" represents an integer which is at least 2.

It is another object of the invention a digital recording apparatus which is capable of performing digital recording at any of a plurality of data compressing rates.

Under that object, a digital information signal recording apparatus arranged according to the invention as another embodiment thereof comprises: first data compressing means for reducing the amount of digital data; second data compressing means for further reducing the amount of the digital data compressed by the first data compressing means; selection means for selectively producing one of the digital data compressed by the first compressing means and the digital data compressed by the second compressing means; and recording means for recording the data selected by the selection means.

Other objects and features of the invention will become apparent from the following description of embodiments thereof taken in connection with the accompanying drawings.

BRIEF DESCRIPTION OF THE DRAWINGS

FIGS. 10(A) and 10(B) show recording patterns formed on tapes by the VTR having the head arrangement as shown in FIGS. 9(A) and 9(B). FIGS. 11(A) and 11(B) are timing charts showing the recording timing of the VTR having the head arrangement thereof arranged as shown in FIGS. 9(A) and 9(B).

DETAILED DESCRIPTION OF THE PREFERRED EMBODIMENTS

Figure 1:
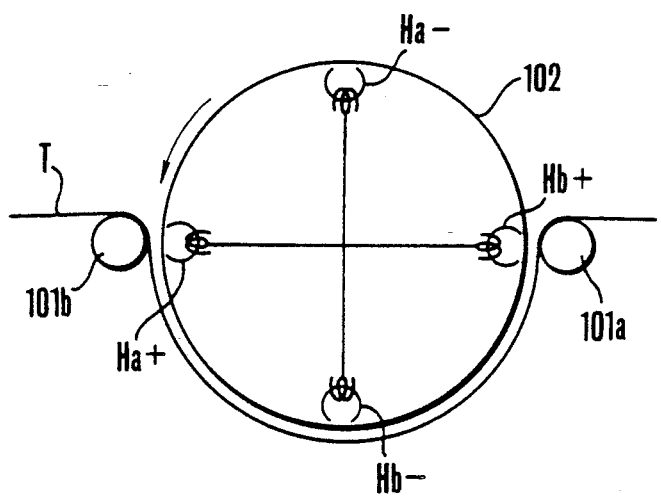
FIG. 1 shows the head arrangement of the conventional video signal recording apparatus arranged to permit the recording time thereof to be changed.
Figure 2A:
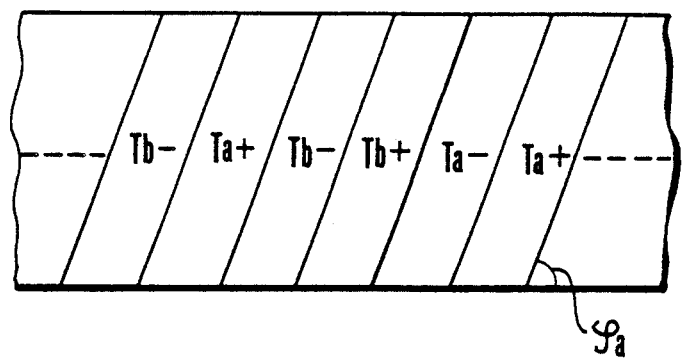
FIGS. 2(A) and 2(B) show recording patterns formed on magnetic tapes in standard and long-time modes by the apparatus having the head arrangement as shown in FIG. 1.
Figure 2B:
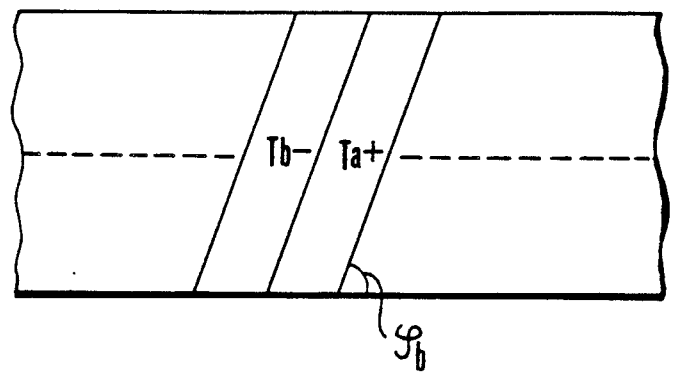
Figure 3:
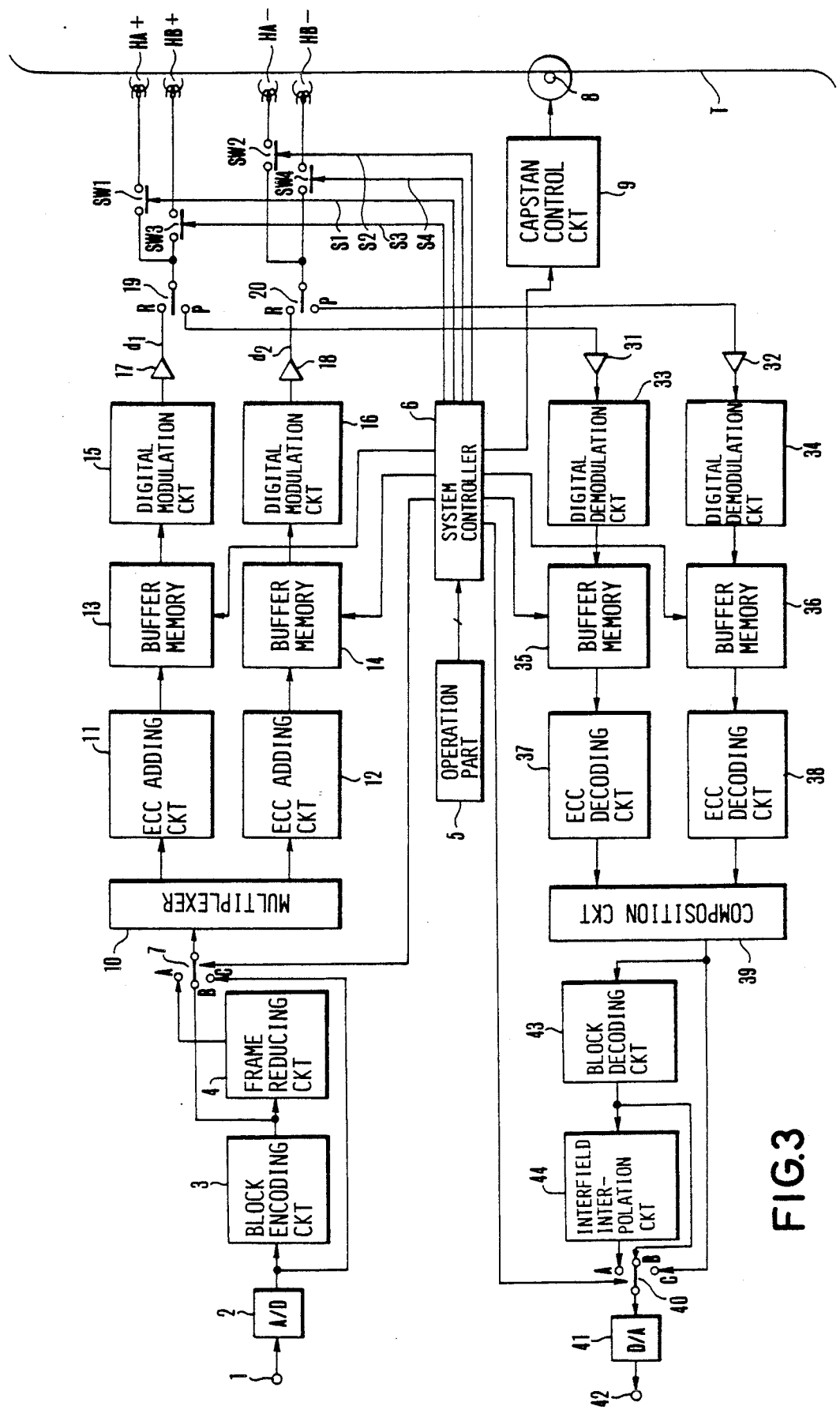
FIG. 3 is a block diagram showing in outline a digital VTR which is arranged according to the invention as an embodiment thereof.

FIG. 3 shows in outline a digital VTR which is arranged as an embodiment of this invention. An input terminal 1 is assumed to be receiving an analog video signal of the interlaced scanning type forming one frame with two fields. The video signal received is sampled by an analog-to-digital (A/D) converter 2 according to a sampling signal of a frequency which is at least twice as high as the highest frequency of the video signal input. The A/D converter 2 thus converts the analog video signal into a digital signal of eight bits.

A block encoding circuit 3 is arranged to divide the digital data obtained from the A/D converter 2 into groups, for example, for every (4 × 4) picture elements which form one block and are vertical and laterally adjoining each other on an image plane. The number of transmitting bits per picture element is thus arranged to be reduced by taking the advantage of the correlativity of images contained in each of the groups. Assuming that the data produced from the A/D converter 2 has eight bits allocated to each of 16 picture elements. The transmitting data for one block has 128 (=8×16) bits. However, the data of a picture element having the maximum value among the picture elements within each block is transmitted by eight bits, and the data of a picture element having the minimum value is also transmitted by eight bits. The data of each picture element within the block is transmitted as data of three bits which are obtained by linearly quantizing the difference between the maximum value and the minimum value into eight steps. With the data transmitted in this manner, the transmitting data consists of 64 (=8 ×2+3×16) bits. Therefore, the transmitting amount of data can be reduced to $\frac{1}{2}$ without excessively deteriorating the picture quality.

A frame reducing circuit 4 is arranged to produce only a first field portion of data within one frame portion of image data produced from the block encoding circuit 3 and does not produce a second field portion of data. Therefore, the frame reducing circuit 4 produces data which is $\frac{1}{2}$ of the amount of data produced from the A/D converter 2.

Figure 4A:
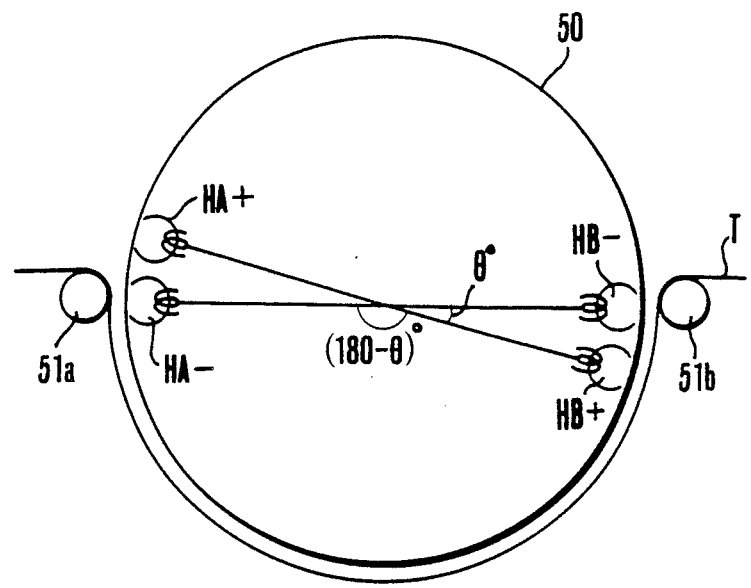
FIGS. 4(A) and 4(B) show the head arrangement of the VTR shown in FIG. 3.
Figure 4B:
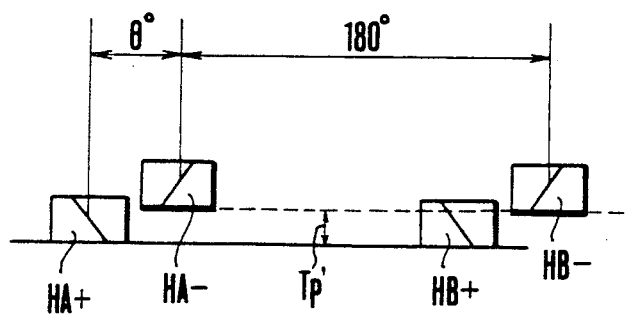

FIGS. 4(A) and 4(B) show the head arrangement of the digital VTR of this embodiment. As shown in FIG. 4(A), a magnetic tape T is wrapped at least 180 degrees around the outer circumferential surface of a rotary cylinder 50. The cylinder 50 is provided with heads HA+ and HB+ which have a first azimuth angle (hereinafter referred to as a plus azimuth) and heads HA− and HB− which have a second azimuth angle (hereinafter referred to as a minus azimuth). The heads HA+ and HB+ are arranged to revolve at a phase difference of 180 degrees from each other and the heads HA− and HB− also at a phase difference of 180 degrees. The heads HA+ and HA− are revolving at a phase difference of a degree $\theta$. The heads HB+ and HB− are likewise revolving at the same phase difference. Further, as shown in FIG. 4(B), the lower sides of the heads HA− and HB− have a stepwise positional difference Tp' from the heads HA+ and HB+ in the axial direction of rotation.

The VTR of this embodiment has three different recording modes, including a standard mode in which the VTR records all the data produced from the above stated A/D converter 2; a double mode in which the VTR records the data produced from the block encoding circuit 3; and a quadruple mode in which the VTR records the data produced from the frame reducing circuit 4. One of these recording modes is manually selectable at an operation part 5. In response to the mode selection, a system controller 6 shifts the connecting position of a switch 7 to one of switch terminals A, B and C as applicable.

The recording operation of the heads in each of the standard, double and quadruple recording modes is as follows: The cylinder 50 is arranged to make two turns while one frame portion of the video signal is supplied to the terminal 1. In case that the input signal is an NTSC signal, the rotational frequency of the cylinder 50 is 3600 r.p.m. In the standard recording mode, each of the heads twice traces the surface of the tape while the cylinder 50 makes two turns. Signal recording is performed by the tracing actions of all the heads. Meanwhile a capstan 8 causes the tape T to travel at a constant speed by which eight tracks are formed at a given track pitch Tp. In this instance, if the angle $\theta$ is set to be sufficiently small, there obtains a relation of Tp=Tp'. In the double recording mode, the heads HA+ and HA− perform signal recording by tracing the tape twice respectively while the cylinder 50 makes two turns. Meanwhile the heads HB+ and HB− do not perform recording. In that instance, if the tracing direction of the heads is arranged to be slanting at a sufficiently small angle relative to the longitudinal direction of the tape T, the capstan 8 causes the tape T to travel at a speed which is $\frac{1}{2}$ of the speed for the standard recording mode. In the quadruple recording mode, each of the heads HA+ and HA− performs recording only once during two tracing performances while the cylinder 50 makes two turns. The tape T is then allowed to travel at a speed which is $\frac{1}{4}$ of the tape speed of the standard recording mode.

Figure 5A:
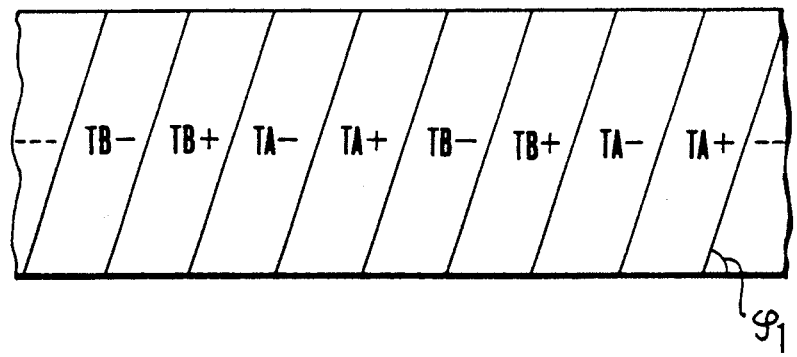
FIGS. 5(A), 5(B) and 5(C) show recording patterns formed on tapes by the VTR of FIG. 3.
Figure 5B:
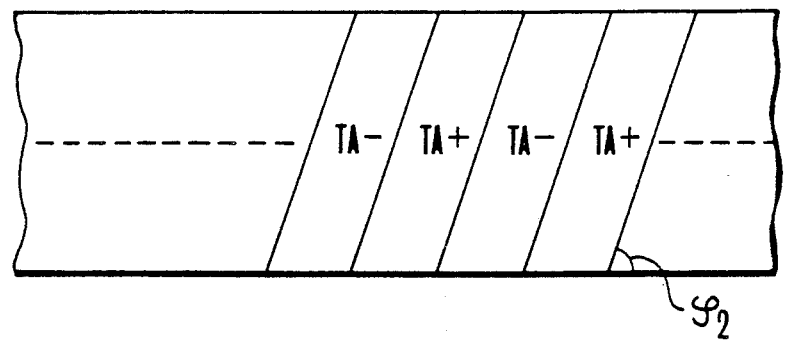
Figure 5C:
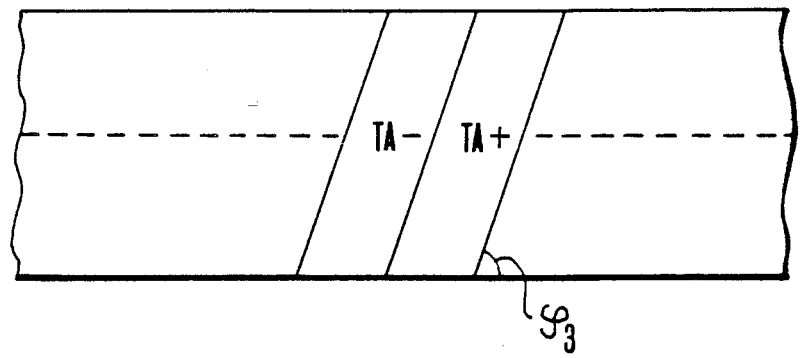

FIGS. 5(A), 5(B) and 5(C) show recording tracks formed on the tape T in the standard, double and quadruple recording modes, respectively. Each of these drawings shows a part in which one frame portion of the video signal is recorded. In these drawings, reference symbols TA+, TA−, TB+ and TB respectively denote recording tracks formed by the heads HA+, HA−, HB+ and HB−. Angles $\phi 1$, $\phi 2$, $\phi 3$ differ from each other. However, if these angles are sufficiently small, the track pitch Tp obtained in these modes remains about the same.

The data which is produced from the switch 7 of FIG. 3 is arranged to be divided into two channels by a multiplexer 10. An error detection code (ECC) is added to the data of the two channels by means of ECC adding circuits 11 and 12. The outputs of the ECC adding circuits 11 and 12 are arranged to be supplied to buffer memories 13 and 14. The buffer memories 13 and 14 are arranged to be caused by the system controller 6 to produce a given amount of data for every period during which the cylinder 50 makes $\frac{1}{2}$ turn. Digital modulation circuits 15 and 16 are arranged to perform known modulating action such as mapping encoding, etc. on the data read out from the buffer memories 13 and 14. The data thus modulated is supplied to amplifiers 17 and 18. The outputs of the amplifiers 17 and 18 are then produced via the terminals R of switches 19 and 20 as recording signals d1 and d2 of the two channels.

Figure 6A:
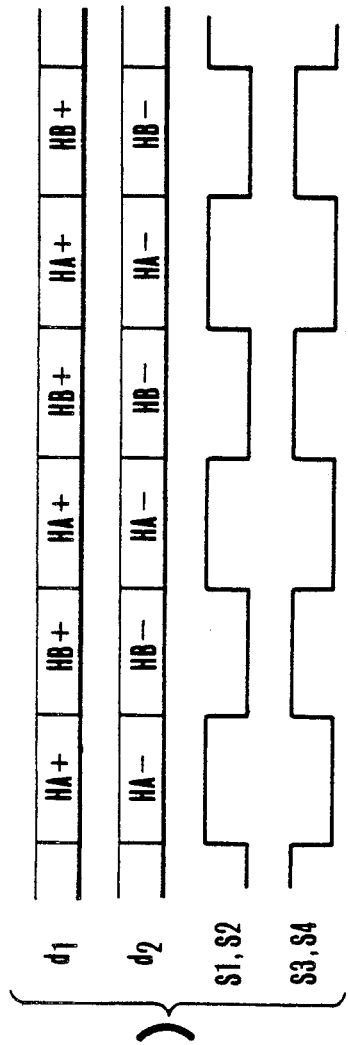
FIGS. 6(A), 6(B) and 6(C) are timing charts showing the operations of various parts of the VTR of FIG. 3.
Figure 6B:
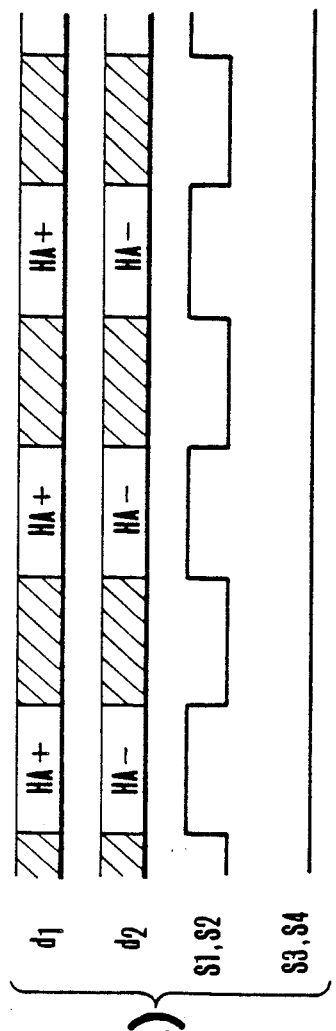
Figure 6C:
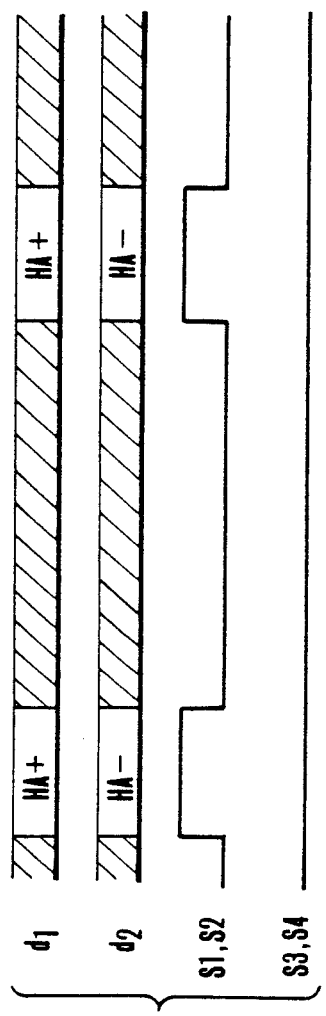

FIGS. 6(A), 6(B) and 6(C) are timing charts showing control signals S1, S2, S3 and S4 produced for switches SW1, SW2, SW3 and SW4 which are provided for recording in the manner as described in the foregoing and also the timing of recording head switch-over to be effected in recording the recording signals d1 and d2 according to the control signals. FIG. 6(A) shows the timing obtained in the standard recording mode, FIG. 6(B) the timing obtained in the double recording mode and FIG. 6(C) the timing obtained in the quadruple recording mode. Further, in these timing charts, the switches SW1 to SW4 are assumed to be turned on when the control signals S1 to S4 are at a high level; and hatched parts indicate the absence of any recording signal.

The VTR arranged in the above stated manner is capable of recording the output of the block encoding circuit 3 as data the amount of which is compressed to ½. The arrangement permits setting three different recording lengths of time without necessitating the VTR to have additional processing circuits for ½ and ¼ compression rates.

Brief description of the reproducing system of the VTR of this embodiment is as follows: The switches SW1, SW2, SW3 and SW4 are arranged to be controlled at the same timing as in the case of recording. With the switches operated in this manner, reproduced signals of two channels are obtained from the terminals P of the switches 19 and 20. The reproduced signals of two channels are supplied via amplifiers 31 and 32 to digital demodulation circuits 33 and 34 to be demodulated there. Demodulated data thus obtained is supplied via buffer memories 35 and 36 to ECC decoding circuit 37 and 38 to undergo an error correction process. The error corrected data is supplied to a composition circuit 39 to be brought back to the original data signal of one channel.

In reproducing a signal recorded in the standard mode, the data output of the above stated composition circuit 39 is supplied as it is to a digital-to-analog (D/A) converter 41 via the terminal C of a switch 40. By this, the data can be restored into an analog video signal. In the case of a signal recorded in the double mode, the data output of the composition circuit 39 is supplied to a block decoding circuit 43 to be decoded from its block encoded state back to its original state of data. After that the decoded data is supplied to the D/A converter 41. In the case of a signal recorded in the quadruple mode, the data output of the block decoding circuit 43 is further supplied to an interfield interpolation circuit 44 to have the field reduced frame portion of the data restored there before it is supplied to the D/A converter 41 via the terminal A of the switch 40. Further, the switch 40 may be operated at the operation part 5 or according to recording mode information which is included in the recording signal in recording and reproduced along with the recorded signal.

With the VTR arranged as described above, for setting three different recording lengths of time on one and the same recording medium, data amount compressing means is provided in a plurality of stages which are arranged in series; and data produced from an intermediate tap of each of the stages are arranged to be recordable. This arrangement, therefore, obviates the necessity of discretely arranging channels, one for each of these different recording modes, including data compressing circuits. Further, one of the plurality of stages is arranged to be the block encoding circuit which reduces the amount of data per picture element while the other is arranged to be the frame reducing circuit which reduces the number of recording picture elements. Therefore, the arrangement enables the VTR to take out data from an intermediate tap without difficulty. Besides, the data compression effected in the plurality of stages causes no salient image deterioration.

While the embodiment described is provided with the head arrangement as shown in FIGS. 4(A) and 4(B), this head arrangement may be differently arranged.

Figure 7:
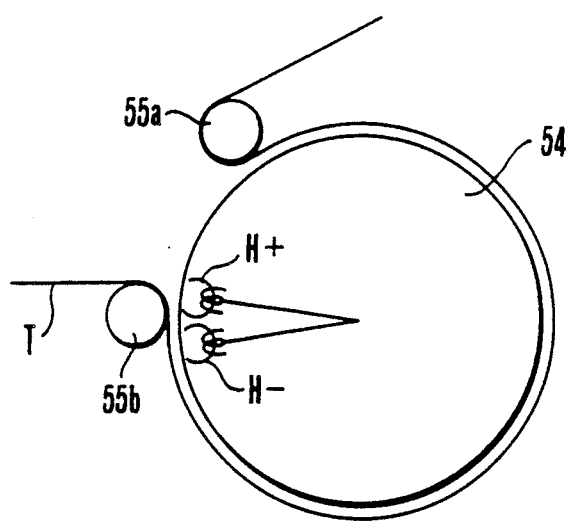
FIG. 7 shows another example of the head arrangement.

FIG. 7 shows an example of the different head arrangement. In this case, a head H+ is of a plus azimuth and a head H− of a minus azimuth. These heads are disposed close to each other and at a stepwise positional difference in the direction of axis of rotation according to the track pitch desired. In this head arrangement, the cylinder 54 is arranged to make one turn during one field period of the video signal. In other words, the cylinder 54 rotates at a speed two times as high as the speed of the head arrangement of FIGS. 4(A) and 4(B). Tape guides 55a and 55b are arranged to wrap the tape T, for example, about 300 degrees around the cylinder 54. The heads H+ and H− are arranged to perform signal recording each time they trace the surface of the tape in the standard recording mode. In an n-times mode in which the data is compressed to 1/n, each of the heads performs signal recording once every time the tape is traced n times, i.e. once in every n number of turns of the cylinder. Since there is some period during which no signal recording is performed in this instance, the period of time allowed for reading from the buffer memories which are arranged as shown in FIG. 3 must be arranged to be shorter than in the case of FIG. 3. For example, with the tape wrapped round over the angle range of X degrees, the reading period must be less than X/360 of one field period.

Figure 8:
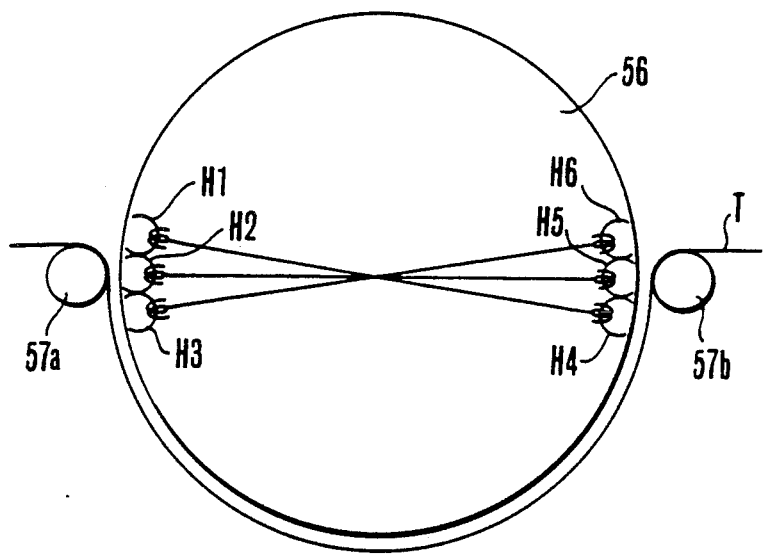
FIG. 8 shows a further example of the head arrangement.

FIG. 8 shows a further example of head arrangement. Referring to FIG. 8, heads H1, H3 and H5 are of the plus azimuth and heads H2, H4 and H6 are of the minus azimuth. The heads H1, H2 and H3 are arranged to shift in the direction of the axis of rotation and the heads H4, H5 and H6 are also arranged in a like manner. This head arrangement performs signal recording simultaneously in three tracks. Therefore, with the amount of data recordable in one track assumed to be the same as in the case of FIGS. 4(A) and 4(B), the rotating speed of the cylinder 56 can be reduced to ⅔ thereof. Tape guides 57a and 57b are arranged to wrap the tape T at least 180 degrees around the cylinder 56. In the standard recording mode, all the heads perform signal recording every time they trace the surface of the tape. In a (2m − 1) times recording mode, all the heads performs signal recording once while tracing is performed m-number of times. The "m" represents a natural number. In this instance, with recording assumed to be performed in an azimuth overlapping manner, the recording mode is limited to a mode in which the amount of data is reduced to an odd fraction.

While the embodiment described is arranged to reduce the amount of data of each picture element by block encoding, the arrangement may be replaced with a method of performing predictive differential encoding or the like. As for the method for reducing the number of picture elements, the embodiment is arranged to simply perform frame reduction. However, the same purpose may be attained by performing sampling in a cycle of n-number of fields, variable density sampling, etc.

Figure 9A:
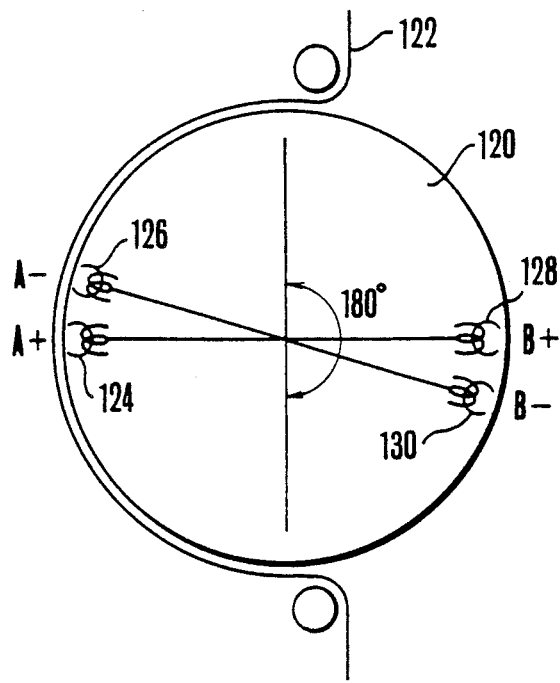
FIGS. 9(A) and 9(B) show the head arrangement of a digital VTR which is arranged according to this invention as another embodiment thereof.
Figure 9B:
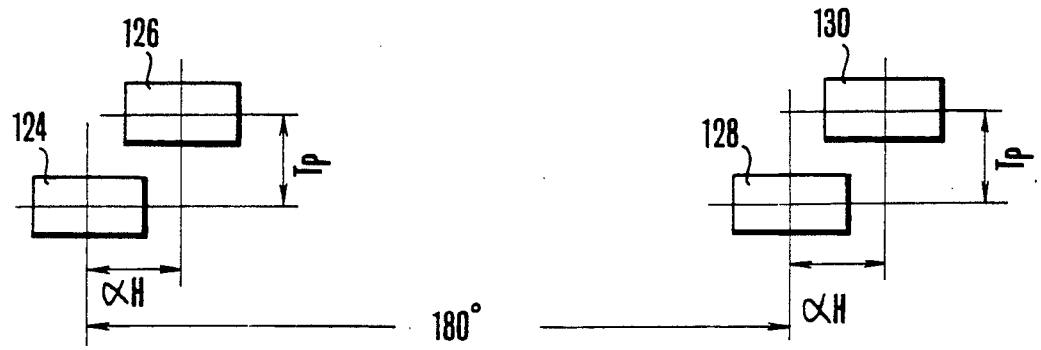

FIGS. 9(A) and 9(B) show a still further example of the head arrangement of the digital VTR according to this invention. FIG. 9(A) is a plan view showing a rotary drum. FIG. 9(B) shows the head arrangement with the rotary drum shown as in a developed state. The illustrations include a rotary drum 120; a magnetic tape 122; and heads 124 to 130. The heads 124 and 126 form a first head pair A. The heads 128 and 130 form a second head pair B. In each of the head pairs A and B, the paired heads are spaced at a very small distance (αH) and arranged in the circumferential direction of the drum 120 according to the pattern of tracing and are spaced at a distance corresponding to a track pitch Tp in the direction of the height of the drum 120. The first and second head pairs A and B are located on opposite sides across the center of the drum 120. The heads 124 and 128 are of the plus azimuth and the heads 126 and 130 of the minus azimuth. In other words, the two opposed heads belonging to different (the first and second) head pairs which are disposed at a phase difference of 180 degrees across the center of the drum 120 are of the same azimuth.

FIGS. 10(A) and 10(B) show recording track patterns formed by the rotary head arrangement of FIGS. 9(A) and 9(B) in different recording modes. FIG. 10(A) shows the track pattern obtained in the standard recording mode. FIG. 10(B) shows the track pattern obtained in a long-time recording mode (or a ½ compression mode).

FIGS. 11(A) and 11(B) are timing charts corresponding to FIGS. 10(A) and 10(B). In FIGS. 11(A) and 11(B), reference symbols A+, A−, B+ and B− denote parts using the heads of head pairs A and B of applicable azimuths. The axis of abscissa shows time, in which one field period (1/60 sec) of the standard TV signal is illustrated. In the standard recording mode, the rotational frequency of the drum is 3,600 rpm. In the long-time recording (½ compression) mode, the tape feed speed is ½ of the speed of the standard mode and the drum is allowed to rotate at 1,800 rpm.

Figure 12A:
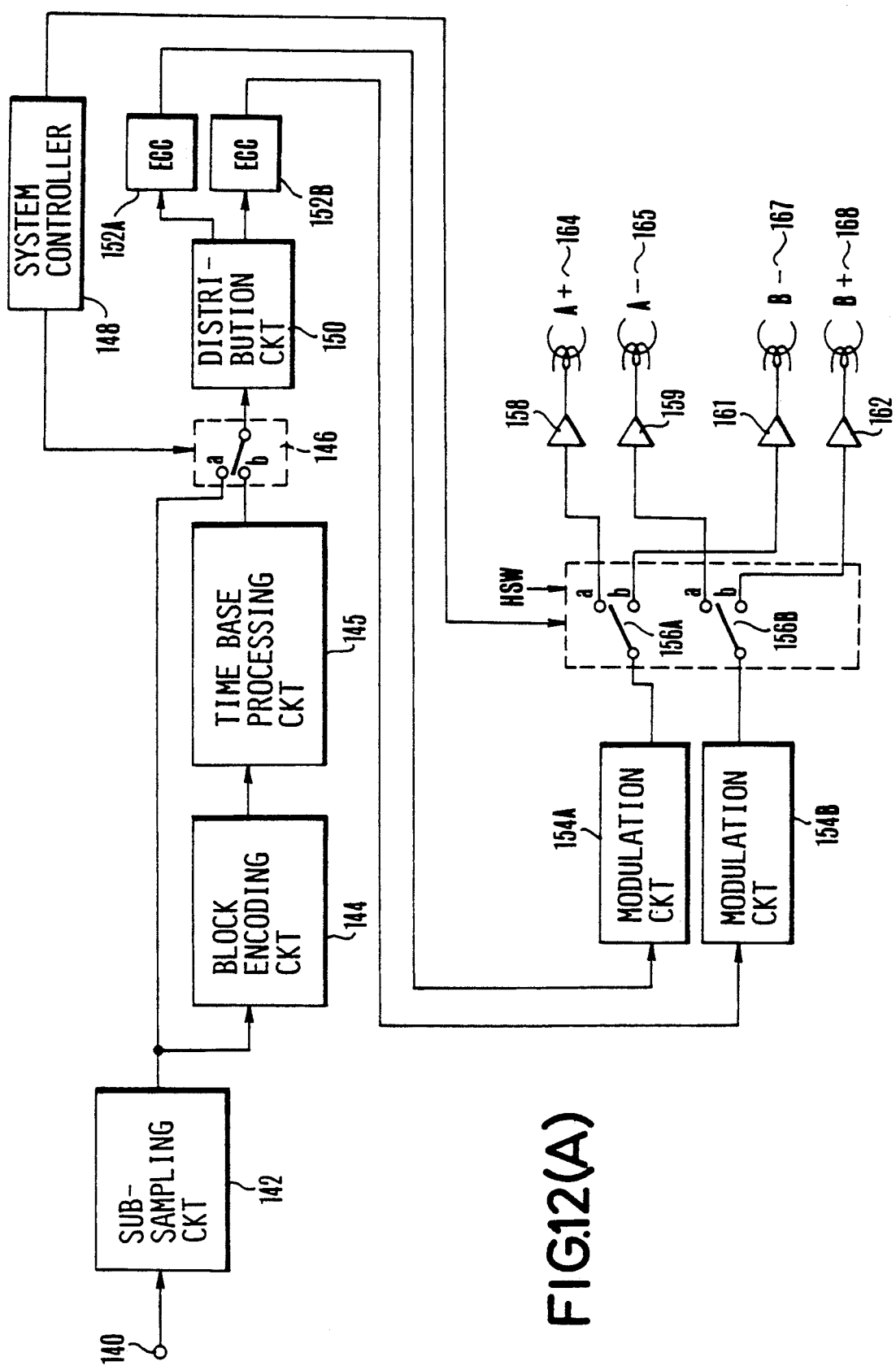
FIGS. 12(A) and 12(B) are block diagrams showing in outline the whole arrangement of the digital VTR which has the head arrangement as shown in FIGS. 9(A) and 9(B).
Figure 12B:
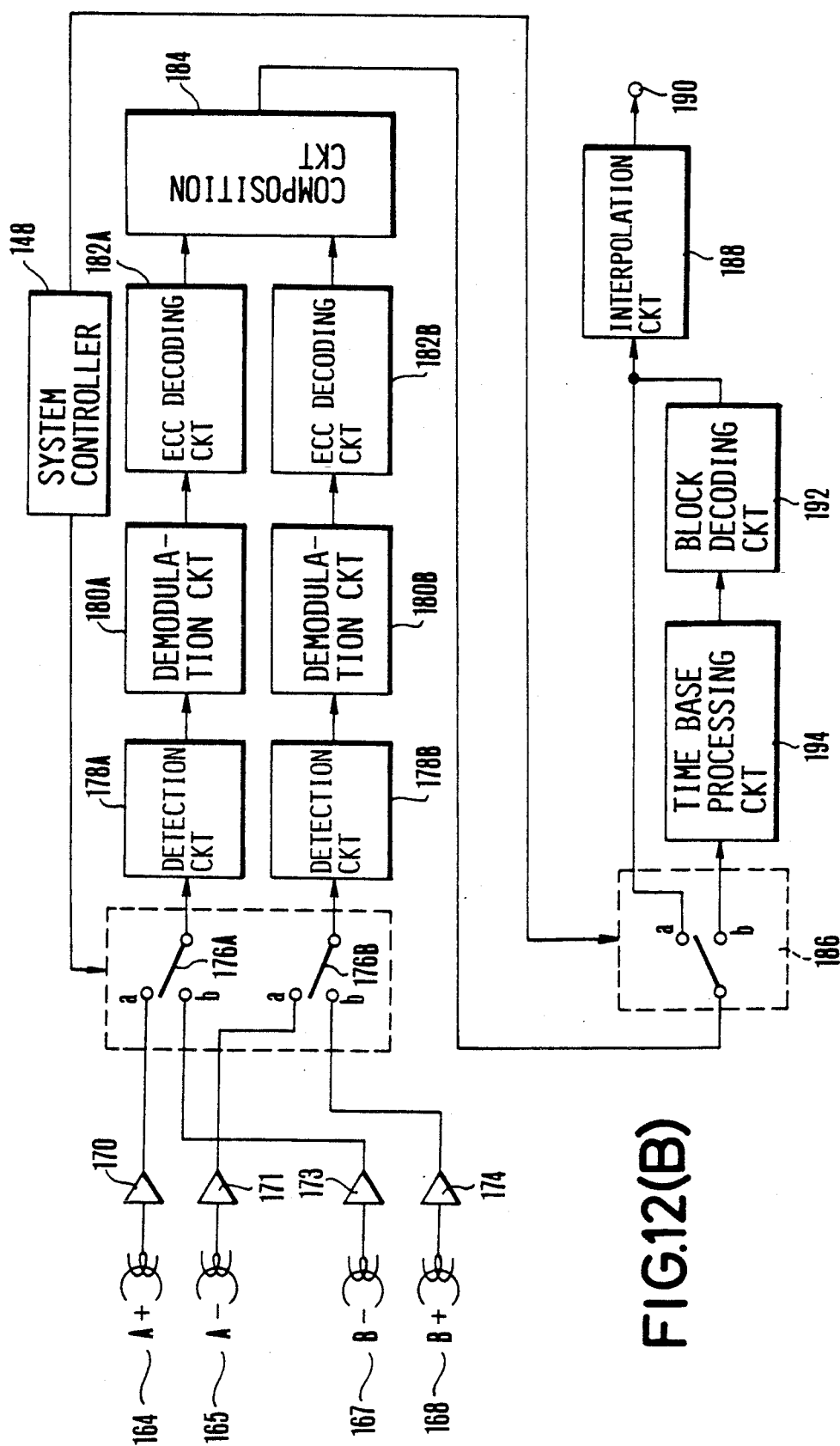

FIGS. 12(A) and 12(B) show in block diagrams the recording and reproducing systems of a digital VTR using the rotary drum which adopts the head arrangement shown in FIGS. 9(A) and 9(B). The recording system is arranged as shown in FIG. 12(A) and the reproducing system as shown in FIG. 12(B). In the case of this embodiment, the frequency band is compressed by ½ sampling in the standard recording mode; and, in the long-time recording mode, the frequency band is further compressed to ½ by block encoding. An input signal received at an input terminal 140 is a composite video signal which consists of a luminance signal Y sampled at a frequency 4 fsc and two color difference signals R-Y and B-Y sampled at a frequency fsc and which is obtained by multiplexing these component signals in a time sharing manner.

A sub-sampling circuit 142 is arranged to perform line offset sub-sampling. The amount of data of the input signal received at the input terminal 140 is reduced to one half thereof by the sub-sampling circuit 142. The output of the sub-sampling circuit 142 is supplied to a contact "a" of a switch 146 and also to a block encoding circuit 144. The block encoding circuit 144 is arranged to perform block encoding by the known MIN/MAX method. In accordance with this method, an image is divided into blocks. Then, within each block, a part of values between maximum and minimum values is equally divided and quantized. For every picture element, several bits indicating applicable one of different quantization levels to which the block belongs are transmitted. In addition to this, the maximum and minimum values are transmitted. This encoding arrangement enables the decoding side of the VTR to reproduce a representative value of quantization. The amount of the transmitting data can be reduced to ½ by this block encoding process. The output of the block encoding circuit 144 is supplied to a time base processing circuit 145 to be expanded on the time base. The output of the time base processing circuit 145 is supplied to a contact "b" of the switch 146.

The switch 146 is arranged to be connected under the control of a system controller 148 to the contact "a" in the standard mode and to the contact "b" in the long-time mode. A distribution circuit 150 is arranged to distribute the signal data from the switch 146 to two channels. The distributed data then undergoes various processes for error detecting, error correction-code adding, interleaving, etc. at ECC encoding circuits 152A and 152B. The outputs of the circuits 152A and 152B are supplied to modulation circuits 154A and 154B to be converted into signals which have less amounts of DC components and are suited for digital recording. The signals thus obtained are supplied to switches 156A and 156B. Each of the switches 156A and 156B is arranged to be connected alternately to contacts "a" and "b" in a cycle of 1/120 sec in the standard mode and in a cycle of 1/60 sec in the long-time recording (½ compression) mode. The VTR includes recording amplifiers 158, 159, 161 and 162; and heads 164, 165, 167 and 168 which are arranged as shown in FIGS. 9(A) and 9(B). Digital data is thus recorded on a magnetic tape. Then, recording tracks are formed on the magnetic tape as shown in FIGS. 10(A) and 10(B).

The reproducing system which is shown in FIG. 12(B) is arranged as follows: The reproducing heads are arranged as shown in FIGS. 9(A) and 9(B). In the case of this embodiment, the recording heads 164, 165, 167 and 168 of FIG. 12(A) are arranged to serve also as reproducing heads. Signals reproduced by the heads 164 to 168 are amplified by reproduction amplifiers 170 to 177. The amplified signals are applied respectively to the contacts "a" and "b" of the switches 176A and 176B as applicable. The switches 176A and 176B are arranged to perform switching under the control of a system controller 148 according to one of the above stated modes selected. The relation between switching connection to the contact "a" or "b" and selection of the standard or long-time mode is the same as the switches 156A and 156B of FIG. 12(A). Each of detection circuits 178A and 178B includes a wave form equalizing part, a clock reproducing part and a discriminating part. A clock signal obtained from the clock reproducing part is voltage-compared with the reproduced signal by the discriminating part. The discriminating part thus makes a discrimination between binary values "0" and "1". The outputs of the detection circuits 178A and 178B are demodulated by demodulation circuits 180A and 180B, respectively. The outputs of the demodulation circuits 180A and 180B are supplied to ECC decoding circuits 182A and 182B to be subjected to error detecting/correcting and deinterleaving processes. A composition circuit 184 then combines the outputs of the circuits 180A and 180B into a signal of one channel.

A switch 186 is arranged to shift its connecting position between contacts "a" and "b" in accordance with a control signal coming from the system controller 148. Therefore, the output of the composition circuit 184 is applied to an interpolation circuit 188 via the contact "a" of the switch 186 in the case of the standard mode. The interpolation circuit 188 is arranged to make interpolation for the picture element which has been thinned out by the sub-sampling circuit 142 during recording. The output of the interpolation circuit 188 is a reproduced video signal. The reproduced video signal thus obtained is supplied from an output terminal 190 to other apparatuses such as a TV monitor or the like. In the case of the long-time mode, the output of the composition circuit 184 is applied to a time base processing circuit 194 via the contact "b" of the switch 186 to undergo a time base processing operation there. The output of the circuit 194 is applied to a block decoding circuit 192 to be decoded into a state of having eight bits per picture element. The output of the block decoding circuit 192 is applied to the interpolation circuit 188 to be subjected to the above stated interpolating process there. In this manner, the signals recorded in the standard recording mode and the block compression recording mode are appositely reproduced.

Figure 13A:
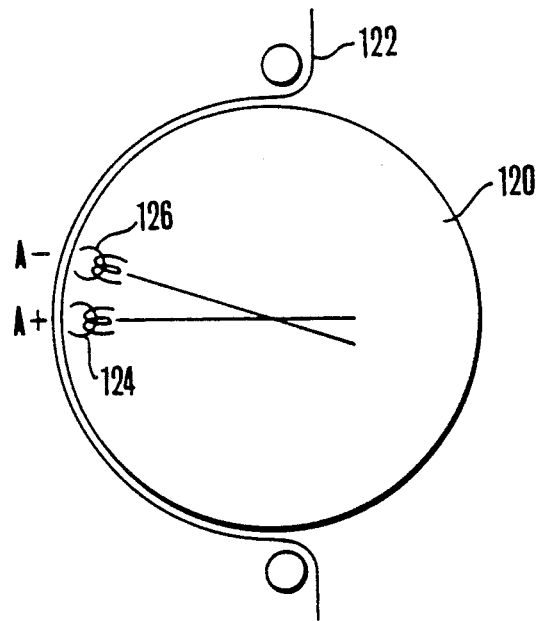
FIGS. 13(A) and 13(B) show another example of head arrangement.
Figure 13B:
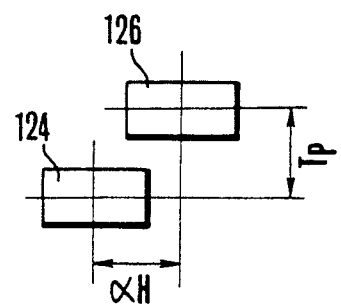
Figure 14A:
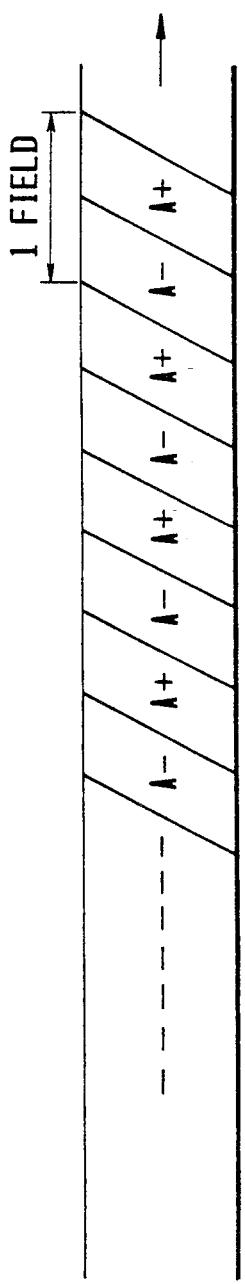
FIGS. 14(A) and 14(B) show recording patterns formed on magnetic tapes by the head arrangement shown in FIGS. 13(A) and 13(B).
Figure 15A:
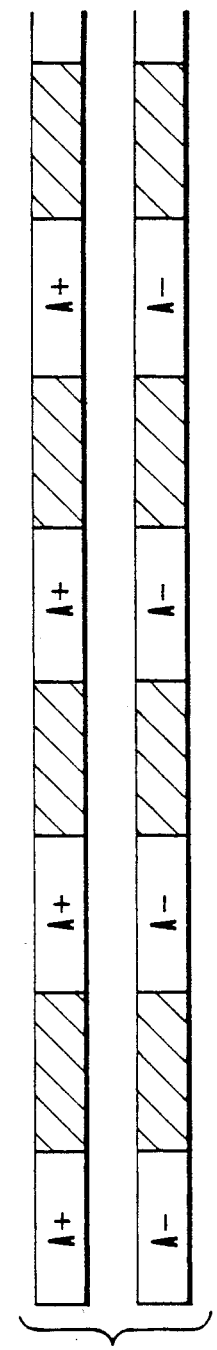
FIGS. 15(A) and 15(B) are timing charts showing a recording operation performed with the head arrangement of FIGS. 13(A) and 13(B).

In the embodiment described above, two opposed head pairs which are disposed 180 degrees away from each other are employed. The same purpose of the invention is, however, attainable with the heads arranged differently from the above stated arrangement of 180 degree opposed head pairs. In other words, the head arrangement may be changed to omit the heads 128 and 130 from the arrangement of FIGS. 9(A) and 9(B). FIGS. 13(A) and 13(B) show an example of such a different head arrangement. In this case, the drum is allowed to rotate at 3,600 rpm in the standard mode. The tape feed speed is thus reduced to ½ of the speed obtained in the case of FIGS. 10(A) and 11(A). An A+ head 124 and an A− head 126 are thus arranged to simultaneously perform signal recording. FIG. 14(A) shows a track pattern thus obtained and FIG. 15(A) shows the timing of the recording operation.

Figure 14B:
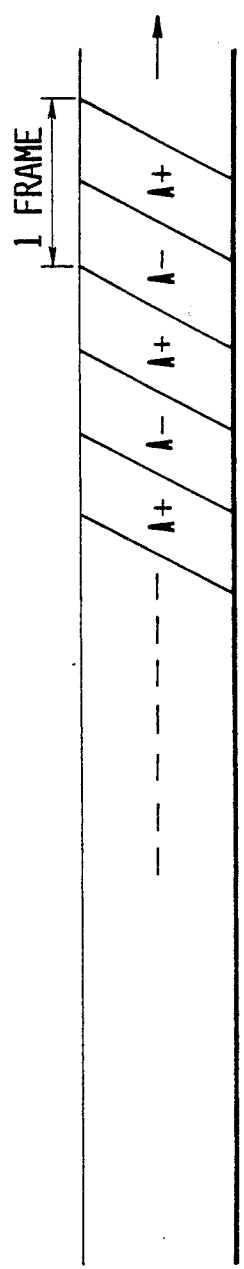
Figure 15B:
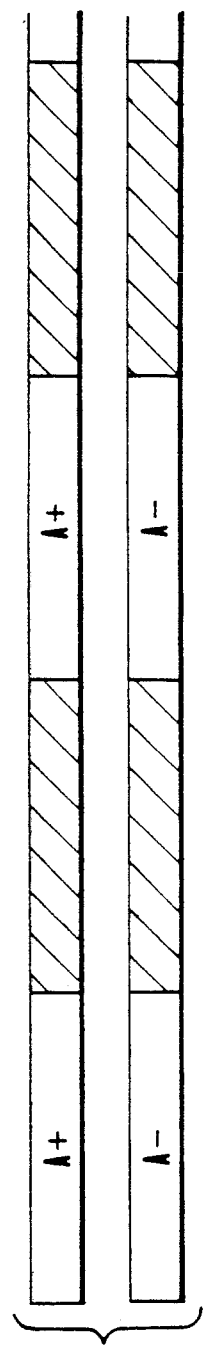

In the event of the long-time recording mode, the rotational frequency of the drum is set at 1,800 rpm which is ½ of the standard mode. The tape feed speed is thus set at a value ½ of the speed obtained in the case of FIG. 15(A). that is, ¼ of the speed obtained in the case of FIG. 10(A). The ½ compressed data is thus recorded after a time base processing operation. A track pattern thus obtained is as shown in FIG. 14(B). The timing of use of the heads is as shown in FIG. 15(B). The heads A+ and A− simultaneously form the track pattern for the first field portion of the signal. Neither of the heads forms the track pattern for a next field portion. In other words, recording in the long-time mode, i.e. The ½ compression recording, is performed with a track pattern A+ and A− formed for each frame. By using this recording method in combination with the recording methods of FIGS. 9(B), 10(A), 10(B), 11(A) and 11(B), recording can be accomplished in a further different recording mode of compressing data to ¼ in addition to the above stated standard recording mode and the long-time recording mode in which data is compressed to ½.

What is claimed is:

1. A digital information signal recording apparatus comprising:
   (a) head means including at least one pair of heads which are arranged to have different azimuth angles and to rotate at adjacent rotating phases to each other;
   (b) data compressing means for reducing the amount of digital data;
   (c) selection means for selectively producing one of a first digital data sequence to be supplied to said data compressing means and a second digital data sequence outputted by said data compressing means;
   (d) signal processing means, arranged to receive the digital data sequence produced from said selection means for supplying two channels of recording signals in parallel to said pair of heads such that a given amount of data is periodically recorded on a recording medium by said pair of heads at a time; and
   (e) mode switching means for switching an operation mode of said apparatus between a plurality of modes, including:
   a first mode in which said selection means produces the first data sequence and said signal processing means supplies in parallel said head means with the two channels of recording signals including the given amount of data for every given period of time t, and
   a second mode in which said selection means produces the second data sequence and said signal processing means supplies in parallel said head means with the two channels of recording signals including the given amount of data for every given period of time nt, wherein "n" represents an integer which is at least 2.

2. An apparatus according to claim 1, further comprising transportation means for transporting the recording medium in the direction of intersecting a tracing direction of said pair of heads, said transportation means being arranged to transport said recording medium at a given speed v in said first mode and at another given speed v/n in said second mode.

3. An apparatus according to claim 2, wherein said pair of heads are arranged to rotate at a given speed w in said first mode and at another given speed w/n in said second mode.

4. An apparatus according to claim 2, wherein the rotating speed of said pair of heads remains the same in both said first and second modes.

5. An apparatus according to claim 4, wherein said head means includes a ($\theta/360$) number of pairs of heads which are arranged to rotate at a phase difference of $\theta$ degrees from each other and said pairs of heads are arranged to rotate 0 degrees during said given period of time t.

6. An apparatus according to claim 1, wherein said data includes image information; and said data compressing means is arranged to reduce the number of pixels includes in each image plane.

7. An apparatus according to claim 1, wherein said data includes image information; and said data compressing means is arranged to reduce the amount of information for every pixel.

8. An apparatus according to claim 7, wherein said data compressing means includes block encoding means.

9. A digital information signal recording apparatus comprising:
   (a) head means including first and second pairs of rotating heads, each pair of rotating heads having different azimuth angles and rotating at adjacent rotating phases to each other;
   (b) data compressing means for reducing the amount of digital data;
   (c) selection means for selectively producing one of a first digital data sequence to be supplied to said data compressing means and a second digital data sequence outputted by said data compressing means;
   (d) signal processing means, arranged to receive the digital data sequence produced from the selection means, for supplying two channels of recording signals to said first and second pairs of rotating heads such that a given amount of data is periodically recorded on a recording medium by said first and second pairs of heads at a time; and (e) mode switching means for switching an operation mode of said apparatus between a plurality of modes including:

a first mode in which said selection means produces the first digital data sequence and said head means performs recording by using both of said first and second pairs of heads, and a second mode in which said selection means produces the second digital data sequence and said head means performs recording by using only said first pair of heads.

10. An apparatus according to claim 9, further comprising transportation means for transporting the recording medium in the direction of intersecting a tracing direction of said first and second pairs of heads, said transportation means being arranged to transport said recording medium at a given speed v in said first mode and at another given speed v/n in said second mode, n being an integer which is at least 2.

11. An apparatus according to claim 10, wherein the rotating speed of said first and second pairs of heads remains the same in both said first and second modes.

12. A digital information signal recording apparatus comprising:

(a) head means including at least one pair of rotary heads which are arranged to have different azimuth angles and to rotate at adjacent rotating phases to each other;

(b) data compressing means for reducing the amount of digital data;

(c) selection means for selectively producing one of a first digital data sequence to be supplied to said data compressing means and a second digital data sequence outputted by said data compressing means;

(d) signal processing means, arranged to receive the digital data sequence produced from said selection means for supplying two channels of recording signals in parallel to said pairs of heads such that a given amount of data is periodically recorded on a recording medium by said pair of heads in a given amount at a time;

(e) transportation means for transporting said recording medium in the direction of intersecting a tracing direction in which said rotary head traces said recording medium; and (f) mode switching means for switching an operation mode of said apparatus between a plurality of modes including:

a first mode in which said selection means produces the first data sequence, said pair of rotary heads rotate at a given speed w and said transportation means transports said recording medium at a given speed v, and a second mode in which said selection means produces the second data sequence, said pair of rotary heads rotate at said given speed w and said transportation means transports said recording medium at a given speed v/n, wherein "n" represents an integer which is at least 2.

13. An apparatus according to claim 12, wherein said data includes image information; and said data compressing means is arranged to reduce the number of pixels includes in each image plane.

14. An apparatus according to claim 12, wherein said data includes image information; and said data compressing means is arranged to reduce the amount of data for every pixel.

15. An apparatus according to claim 12, wherein said data compressing means includes block encoding means.

16. A digital information signal recording apparatus comprising:

(a) input means for inputting a first data sequence;

(b) first data compressing means for reproducing the amount of digital data of said first data sequence to produce a second data sequence;

(c) second data compressing means for reducing the amount of said digital data of said second data sequence to produce a third data sequence;

(d) selection means for selectively producing one of said second data sequence and said third data sequence; and (e) recording means for recording data sequence selected by said selection means.

17. An apparatus according to claim 16, wherein said first data sequence includes image information; and said first data compressing means is arranged to reduce the number of pixels included in each image plane.

18. An apparatus according to claim 17, wherein said second data compressing means is arranged to reduce the amount of data for every pixel.

19. An apparatus according to claim 18, wherein said second data compressing means includes a block encoding means.

20. An apparatus according to claim 16, wherein said selection means is arranged to selectively produce one of said first, second and third data sequences.

* * * * *

UNITED STATES PATENT AND TRADEMARK OFFICE
CERTIFICATE OF CORRECTION

PATENT NO. : 5,063,453

DATED : November 5, 1991

INVENTOR(S) : Katsuji Yoshimura, et al

It is certified that error appears in the above-identified patent and that said Letters Patent is hereby corrected as shown below:

Col. 2, line 22, Change "traces" to --trace--.
line 55, Change "int he" to --in the--.

Col. 4, line 1, After "invention" insert --to provide--.

Col. 6, line 31, Change "TB" to -- -TB --. (second Occurence)

Col. 8, line 19, Change "round" to --around--.
line 37, Change "performs" to --perform--.

Col. 11, line 42, Before "9(B)" insert --9(A), --.

Col. 13, line 18, Delete ","n" and insert --.--.
line 19, Delete "being ad integer which is at least 2."

Col. 14, line 15, Change "includes" to --included--.

Signed and Sealed this

Twenty-seventh Day of April, 1993

Attest:

MICHAEL K. KIRK

Attesting Officer          Acting Commissioner of Patents and Trademarks